US012609478B2

(12) United States Patent
Liu et al.

(10) Patent No.: US 12,609,478 B2
(45) Date of Patent: Apr. 21, 2026

(54) CONNECTOR AND A CONNECTOR ASSEMBLY COMPRISING THE SAME

(71) Applicant: Tyco Electronics (Shanghai) Co., Ltd., Shanghai (CN)

(72) Inventors: Jiaoyong (Mac) Liu, Shanghai (CN); Hongqiang (Sean) Han, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 577 days.

(21) Appl. No.: 18/086,778

(22) Filed: Dec. 22, 2022

(65) Prior Publication Data

US 2023/0208067 A1 Jun. 29, 2023

(30) Foreign Application Priority Data

Dec. 23, 2021 (CN) ......................... 202111593109.7

(51) Int. Cl.

*H01R 13/502* (2006.01)
*H01R 12/58* (2011.01)
*H01R 12/71* (2011.01)
*H01R 13/26* (2006.01)
*H01R 13/631* (2006.01)

(52) U.S. Cl.

CPC ........... *H01R 13/502* (2013.01); *H01R 12/58* (2013.01); *H01R 12/716* (2013.01); *H01R 13/26* (2013.01); *H01R 13/631* (2013.01)

(58) Field of Classification Search

CPC .... H01R 13/502; H01R 13/514; H01R 12/52; H01R 12/7088; H01R 12/716; H01R 12/718; H01R 13/26; H01R 12/55

USPC ...................................................... 439/78–84

See application file for complete search history.

(56) References Cited

U.S. PATENT DOCUMENTS

| | | | | | |
|---|---|---|---|---|---|
| 5,156,553 | A * | 10/1992 | Katsumata | H01R 12/716 | 439/62 |
| 5,947,754 | A * | 9/1999 | Lin | H01R 12/716 | 439/79 |
| 6,471,523 | B1 * | 10/2002 | Shuey | H01R 13/112 | 439/63 |
| 9,325,115 | B2 * | 4/2016 | Zhang | H01R 24/62 | |
| 11,888,252 | B2 * | 1/2024 | Chang | H01R 13/506 | |
| 2019/0052004 | A1 * | 2/2019 | Hasegawa | H01R 12/716 | |

FOREIGN PATENT DOCUMENTS

JP 2021061124 A * 4/2021

OTHER PUBLICATIONS

ENG Translation of Nishiwaki (JP-2021061124-A) (Year: 2021).*

* cited by examiner

*Primary Examiner* — Abdullah A Riyami
*Assistant Examiner* — Amara Anderson
(74) *Attorney, Agent, or Firm* — Barley Snyder

(57) ABSTRACT

A connector includes a housing, two power supply terminals, and an insert inserted into the housing. The insert includes a base to which the two power supply terminals are mounted, and two support arms extending from the base. Free ends of the two support arms are positioned to support a respective power supply terminal.

20 Claims, 4 Drawing Sheets

CONNECTOR AND A CONNECTOR ASSEMBLY COMPRISING THE SAME

CROSS-REFERENCE TO RELATED APPLICATIONS

This application claims the benefit of Chinese Patent Application No. 202111593109.7 filed on Dec. 23, 2021, the whole disclosure of which is incorporated herein by reference.

FIELD OF THE INVENTION

The present disclosure relates to a connector for connecting a matching connector to a circuit board and a connector assembly comprising the same.

BACKGROUND

A connector used to attach a matching connector to a circuit board typically uses auxiliary cantilever(s) made of stainless steel to support power supply terminal(s). As a result, the connectors have relatively larger numbers of parts and thus require relatively larger numbers of molds to manufacture these parts. This results in relatively higher mold expenses. The auxiliary cantilevers are crimped and fixed to the power supply terminals, resulting in a more complicated assembly process of the connector. Ground terminals are constructed as roughly L-shaped for easily mounting to a housing of the connector. However, this results in relatively larger lateral dimensions of the housing and the connector, which is not conducive to large-scale connector integration. A cable is attached to one end of the housing, making it difficult to attach the connector directly to the circuit board. Existing connectors are incapable of establishing interconnections between a three-layer cascading bus bar and a circuit board.

SUMMARY

According to an embodiment of the present disclosure, a connector includes a housing, two power supply terminals and an insert inserted into the housing. The insert includes a base to which the two power supply terminals are mounted, and two support arms extending from the base. Free ends of the two support arms are positioned to support a respective power supply terminal.

BRIEF DESCRIPTION OF THE DRAWINGS

The invention will now be described by way of example with reference to the accompanying Figures, of which.

DETAILED DESCRIPTION OF THE EMBODIMENTS

Figure 1:
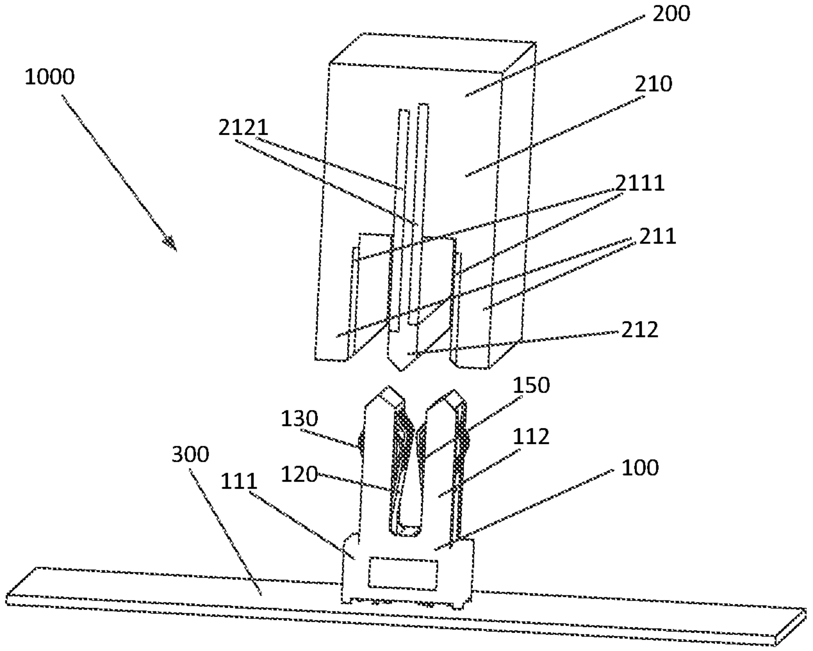
FIG. 1 is a perspective view of a connector assembly according to an embodiment of the disclosure, showing a connector of the connector assembly being plugged into a matching connector of the connector assembly.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
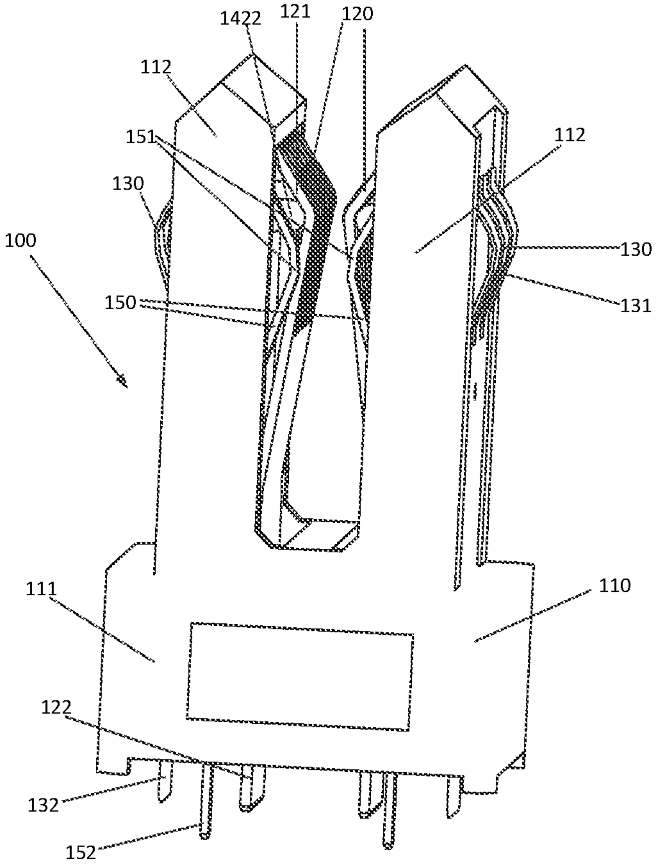
FIG. 2 is a perspective view of the connector shown in FIG. 1.
Figure 3:
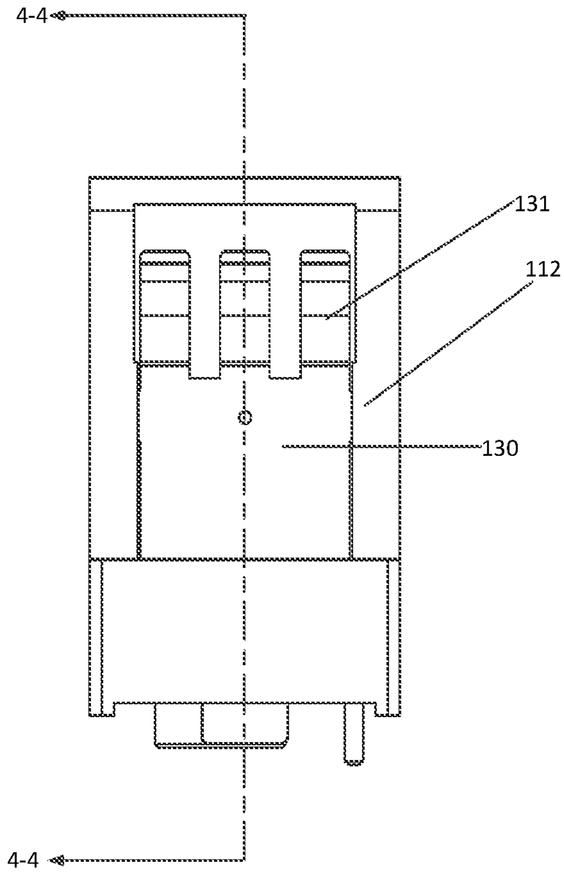
FIG. 3 is a side view of the connector shown in FIG. 2.
Figure 4:
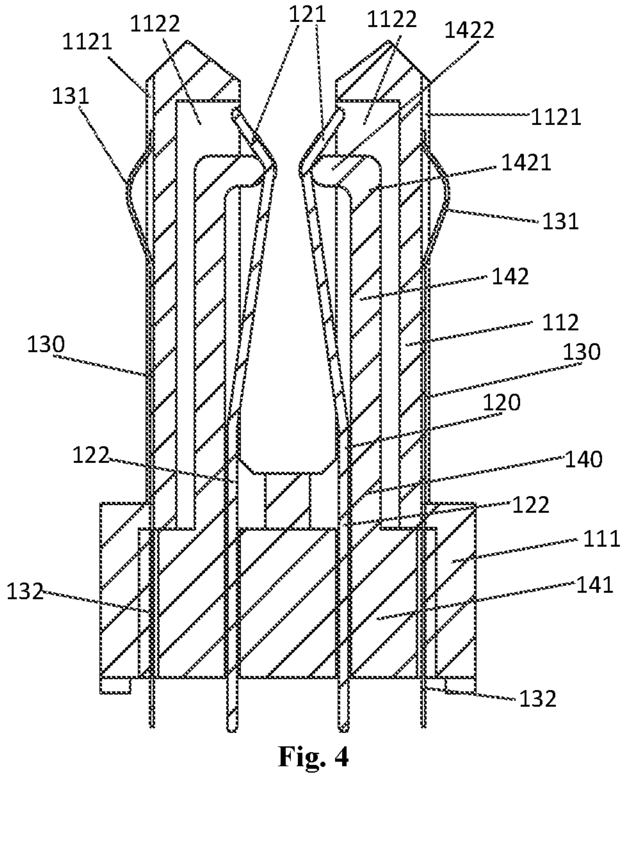
FIG. 4 is a cross-section taken along a line 4-4 in FIG. 3.
Figure 5:
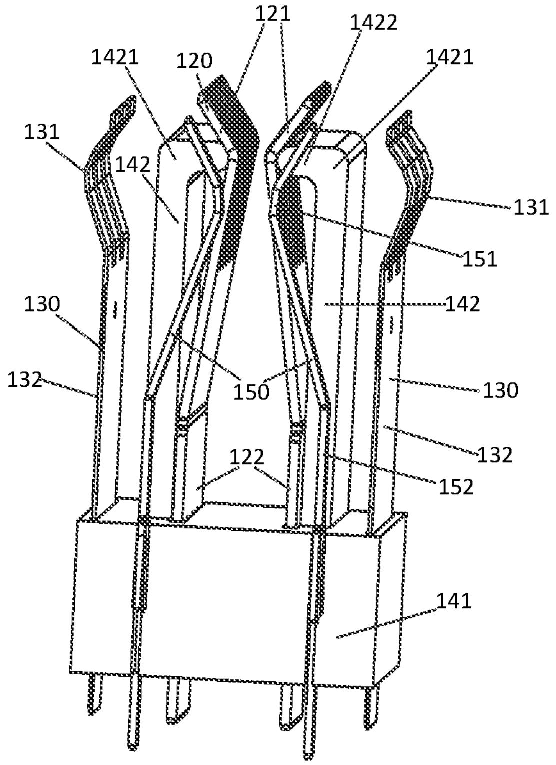
FIG. 5 is a perspective view of the connector in FIG. 2 after the housing has been removed, showing only an insert and terminals mounted on it.
Figure 6:
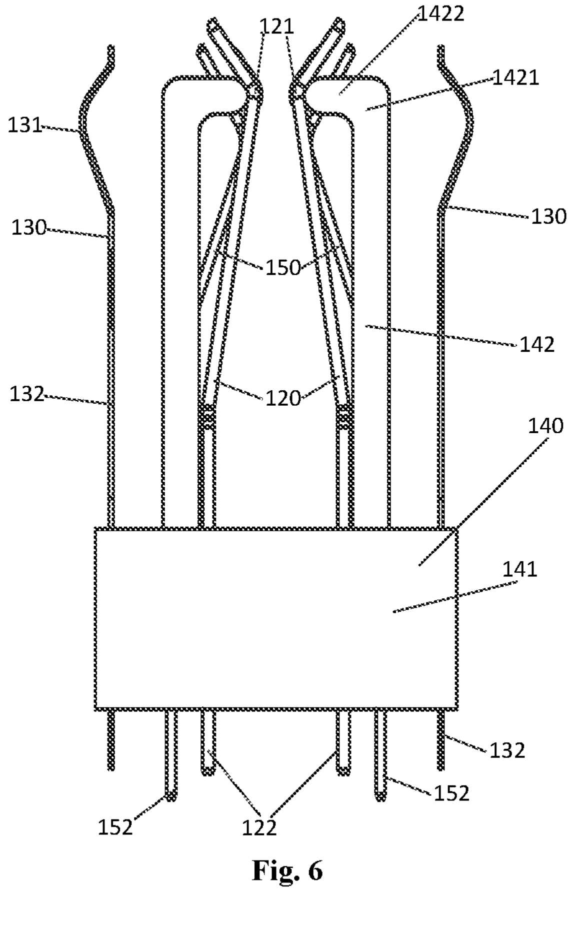
FIG. 6 is a side view of the connector in FIG. 2 after the housing has been removed, showing only the insert and the terminals mounted on it.
Figure 7:
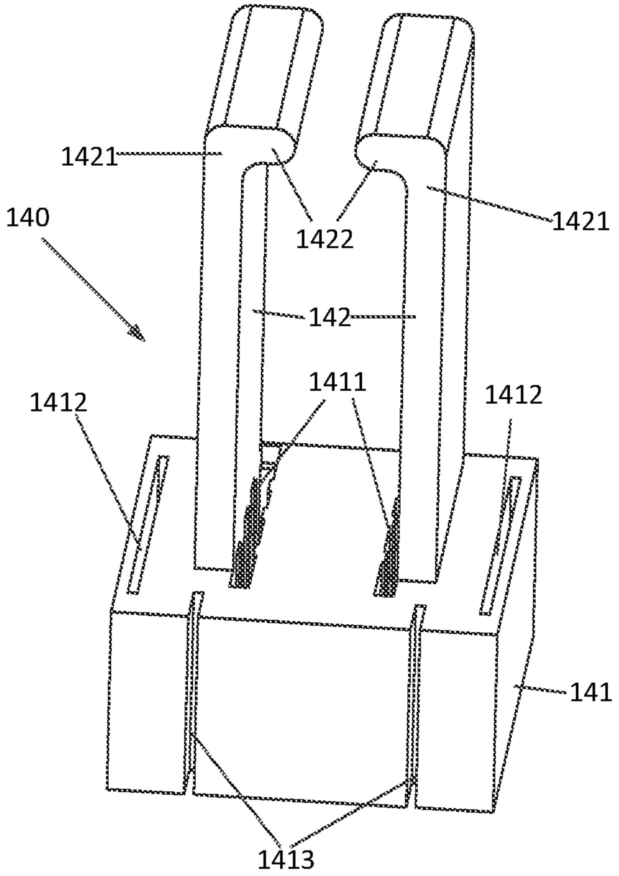
FIG. 7 is a perspective view showing only the insert in FIG. 5.

This disclosure provides a connector 100, which will be described below in an application of connecting a matching or mating connector 200 to a circuit board 300. However, the connector 100 of the disclosure is not limited to this and may be used for any suitable purpose. FIG. 1 shows how the matching connector 200 is connected to the circuit board 300 via the connector 100. More specifically, referring to FIG. 2, the connector 100 comprises a housing 110, two power supply terminals 120, two ground terminals 130, and an insert 140 made of plastic (see FIG. 4). The insert 140 is adapted (i.e., sized) for insertion into the housing 110. Referring to FIGS. 4 and 5, the insert 140 comprises a base 141 and two support arms 142. The two power supply terminals 120 and the two ground terminals 130 are installed to the base 141 by plugging into corresponding openings 1411 and 1412 in the base 141 (see FIG. 7). The two support arms 142 extend from the base 141 respectively so that free ends 1421 of the two support arms 142 may respectively support corresponding power supply terminals 120. Each of the two power supply terminals 120 comprises a bent connecting end 121 supported by a free end 1421 of a respective one of the support arms 142. Referring to FIGS. 3-7, the two support arms 142 respectively comprise projections 1422 extending toward each other from respective free ends 1421 thereof to support respective connecting end 121.

The exemplary embodiment replaces auxiliary cantilevers made of stainless steel with the two support arms 142 integrally formed on the base 141 to support the connecting ends 121 of the power supply terminals 120 respectively. This not only reduces the number of parts, but also avoids crimping the stainless-steel auxiliary cantilevers to the connecting ends 121 of the power supply terminals 120 respectively, reducing the complexity of assembly process caused by crimping, and decreasing molds and associated costs for making the stainless-steel auxiliary cantilevers.

In addition, the two support arms 142 integrally formed on the base 141 are supported on the power supply terminals 120 respectively so that the two power supply terminals 120 are relatively fixedly positioned in a condition that the connector 100 is inserted into the matching connector 200.

Thus, the problem of the prior art of, in the case of two separate auxiliary cantilevers, the two power supply terminals 120 and the auxiliary cantilevers crimped to them shifting relative to each other in a condition that the connector 100 is inserted into the matching connector 200 is avoided.

The housing 110 comprises an accommodating part 111 and two guide arms 112. The accommodating part 111 is configured to accommodate the base 141 inserted therein (see FIG. 4). The two guide arms 112 extend from the accommodating part 111 respectively for insertion into the matching connector 200 (see FIG. 1). The guide arms 112 will be described in further detail below with reference to FIGS. 1 and 8.

Referring now to FIG. 4, after the insert 140 is inserted into the housing 110, the two power supply terminals 120 are located between the two support arms 142, which are in turn located between the two guide arms 112 located between the two ground terminals 130. As shown in FIG. 5, the two support arms 142 are positioned between the two ground terminals 130 when the insert 140 is not inserted into the housing 110 or after the housing 110 is removed. This arrangement ensures adequate electrical insulation between the power supply terminals 120 and the ground terminals 130.

Still referring to FIGS. 4 and 5, the connector 100 further comprises two detection terminals 150 adapted to detect a position at which the connector 100 is inserted into the matching connector 200. The detection terminals 150 mounted to the base 141 by their insertion into jack sockets 1413 (see FIG. 7), such that curved connecting end 151 of the two detection terminals 150 are positioned between the two support arms 142 and are spaced from the power supply terminals 120 respectively in a direction transverse to the power supply terminals 120. This ensures sufficient electrical insulation between the detection terminals 150 and the power supply terminals 120 as well as the ground terminals 130.

Referring to FIGS. 1, 2, 3 and 5, the connecting ends 121 of the power supply terminals 120 and the connecting ends 131 of the ground terminals 130 are formed respectively into a plurality of bent fingers which are separated apart from one another, and respective connecting ends 151 of each of the detection terminals 150 is formed into a single bent finger. Mounting ends 122, 132 and 152 of the two power supply terminals 120, the two ground terminals 130 and the two detection terminals 150 mounted on the base 141 are respectively configured in the form of straight strips for easy insertion into the base 141 and the housing 110. This not only simplifies assembly operation of the terminals 120, 130, 150 to the base 141 and the housing 110, but also enables the accommodating part 111 of the housing 110 to be designed with a smaller waist or transverse dimension (i.e., the dimension transverse to an extension direction of the guide arms 112). This facilitates miniaturization of the connector 100 and thus large-scale integration onto the circuit board 300.

Figure 8:
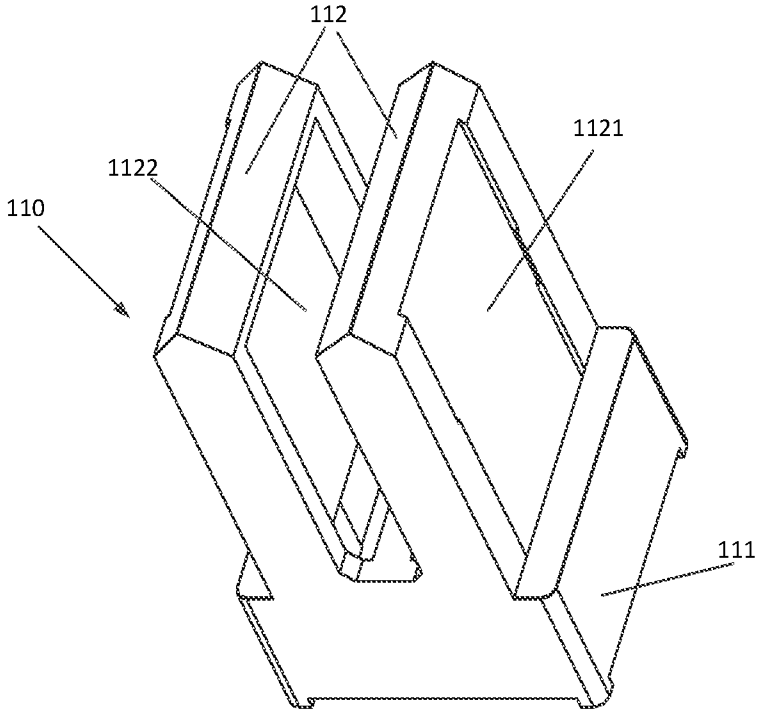
FIG. 8 is a perspective view showing only the housing in FIG. 2.

Referring to FIGS. 4, 5 and 8, each of the guide arms 112 is provided with both a first groove 1121 and a second groove 1122 on opposite sides thereof. The first groove 1121 is adapted to accommodate a respective one of the ground terminals 130, and the second groove 1122 is adapted to accommodate a respective one of the support arms 142. In this way, when connector 100 is inserted into the matching connector 200, the first groove 1121 limits lateral movements of the connecting ends 151 of the ground terminals 130 and the second groove 1122 limits lateral movements of the support arms 142, the connecting ends 121 of the power supply terminals 120 and the connecting ends 151 of the detection terminals 150. This increases the reliability of an electrical connection between the connector 100 and the matching connector 200.

Referring to FIGS. 1, 2 and 4-6, the mounting ends 122, 132 and 152 protrude from the base 141 and the accommodating part 111 in a direction facing away from the support arms 142 respectively to facilitate directly inserting the connector 100 into the circuit board 300, simplifying assembly between the connector 100 and the circuit board 300.

Referring again to FIG. 1, the disclosure also provides a connector assembly 1000, which includes the connector 100 and the matching connector 200 as described above. The matching connector 200 comprises a matching housing 210 provided with two side arms 211 and an intermediate arm 212 located between the two side arms 211. Each of the side arms 211 is provided with a matching ground terminal 2111 on a side thereof facing the intermediate arm 212. The intermediate arm 212 is provided with the matching power supply terminals 2121 located respectively on opposed sides thereof facing the two side arms 211. The matching ground terminals 2111 and the matching power supply terminals 2121 are configured in the form of flat plates.

As the connector 100 is inserted into the matching connector 200, the intermediate arm 212 is inserted between the two support arms 142, and each of the support arms 142 and a respective one of the guide arms 112 are inserted between the intermediate arm 212 and a corresponding side wall 211. In this way, each of the matching power supply terminals 2121 is pressed against a respective one of the power supply terminals 120. Each of the matching ground terminals 2111 is pressed against a respective one of the ground terminals 130.

When the connector 100 is inserted into the matching connector 200, the bent finger of each of the detection terminals 150 also rests against a respective one of the matching power supply terminals 2121. A point of contact between the finger and the corresponding matching power supply terminal 2121 moves with the connector 100 being inserted into the matching connector 200. As a result, an electrical signal representative of the position of the contact point on the matching power supply terminal 2121 may be generated, and transmitted by the detection terminal 150 to a detection circuit arranged on the circuit board 300 to detect an insertion position of the connector 100 into the matching connector 200. This avoids an electrical instability caused by the connector 100 failing to be inserted in place into the matching connector 200, and potential damage to the terminals 120, 130 caused by the connector 100 being excessively inserted in the matching connector 200.

When the connector 100 is inserted into the matching connector 200, each of the guide arms 112 is inserted between the intermediate arm 212 and a respective one of the side arms 211. This guides the connector 100 to be inserted into the matching connector 200, and further supports the ground terminals 130 when the ground terminals 130 are pressed against the matching ground terminals 2111 respectively and the detection terminals 150 when the detection terminals 150 are pressed against the matching power supply terminals 2121 respectively. This arrangement prevents excessive deformation of the ground terminals 130 and the detection terminals 150 and ensures good contacts between the terminals 130, 2111 as well as good contact between the terminals 150, 2121.

The connector 100 and the connector assembly 1000 of the present disclosure facilitates an interconnection between a three-layer cascading bus bar (i.e., two side arms 211 each having the terminal 2111 and one intermediate arm 212 having two terminals 2121) and the circuit board 300.

Although the connector 100 in this disclosure is constructed as a straight connector, it should be understood by a skilled person in the field that the connector may also be constructed as an L-shaped bent connector, with one side of the L-shaped bent connector inserted to the circuit board 300 and the other side of the L-shaped bent connector inserted to the matching connector 200.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a housing defining two guide arms, each of the guide arms having both a first groove and a second groove on opposite sides thereof;

two power supply terminals; and an insert inserted into the housing, including:

a base to which the two power supply terminals are mounted; and two support arms extending from the base, free ends of the two support arms positioned to support respective ones of the power supply terminals.

2. The connector of claim 1, further comprising two ground terminals mounted to the base.

3. The connector of claim 2, wherein each of the two power supply terminals includes a bent connecting end supported by the free end of a respective one of the support arms.

4. The connector of claim 3, wherein the two support arms define respective projections extending toward each other from free ends thereof and support respective bent connecting ends of the two power supply terminals.

5. The connector of claim 2, wherein the two power supply terminals are located between the two support arms, and the two support arms are located between the two ground terminals.

6. The connector of claim 5, further comprising two detection terminals adapted to detect a position of the connector as it is inserted into a matching connector, the two detection terminals mounted to the base such that curved connecting ends thereof are positioned between the two support arms and are spaced from the power supply terminals in a direction transverse to a direction of elongation of the power supply terminals.

7. The connector of claim 6, wherein mounting ends of the two power supply terminals, the two ground terminals and the two detection terminals mounted on the base each define straight strips inserted into the base.

8. The connector of claim 7, wherein the mounting ends extend through the base and protrude from the base and the housing in a direction facing away from the support arms.

9. The connector of claim 6, wherein connecting ends of the power supply terminals and the ground terminals are formed into a plurality of respective bent fingers which are separated apart from one another, respective connecting ends of each of the detection terminals are formed into a single bent finger.

10. The connector of claim 2, wherein the two guide arms are sized and positioned to be inserted into a matching connector, the guide arms located between the two ground terminals, and the two support arms positioned between the two guide arms.

11. The connector of claim 10, wherein the first groove accommodating a respective one of the ground terminals and the second groove accommodating a respective one of the support arms.

12. A connector assembly adapted to connect to a circuit board comprising, a connector including:

a housing having two guide arms, each of the guide arms having both a first groove and a second groove on opposite sides thereof;

two power supply terminals;

two ground terminals;

an insert configured to insert into the housing and comprising a base, to which the two power supply terminals and the two ground terminals are respectively mounted; and two support arms extending from the base respectively so that free ends of the two support arms are capable of supporting curved connecting ends of respective ones of the power supply terminals respectively, the two power supply terminals being located between the two support arms and the two support arms being located between the two ground terminals; and a matching connector including a matching housing receiving the connector, the matching housing defining two side arms and an intermediate arm located between the two side arms, wherein:

each of the side arms includes a matching ground terminal on a side thereof facing the intermediate arm, and the intermediate arm includes matching power supply terminals located respectively on opposed sides thereof facing the two side arms; and with the connector inserted into the matching connector, the intermediate arm is inserted between the two support arms, and each of the support arms is inserted between the intermediate arm and a respective one of the side arms, and each of the matching power supply terminals is pressed against a respective one of the power supply terminals and each of the matching ground terminals is pressed against a respective one of the ground terminals.

13. The connector assembly of claim 12, further comprising two detection terminals mounted on the base, connecting ends of the two detection terminals positioned between the two support arms and spaced from respective ones of the power supply terminals in a direction transverse to the power supply terminals.

14. The connector assembly of claim 13, wherein, with the connector inserted into the matching connector, each of the detection terminals is pressed against a respective one of the matching power supply terminals to enable detection of a position of the connector inserted into the matching connector.

15. The connector assembly of claim 14, wherein the housing has an accommodating part receiving the base, the two guide arms extending from the accommodating part and located between the two ground terminals, the two support arms positioned between the two guide arms.

16. The connector assembly of claim 15, wherein, with the connector inserted into the matching connector, each of the guide arms is inserted between the intermediate arm and a respective one of the side arms.

17. The connector assembly of claim 16, wherein mounting ends of the two power supply terminals, the two ground terminals and the two detection terminals mounted on the base are formed as straight strips and inserted through the base.

18. The connector assembly of claim 12, wherein the matching ground terminals and the matching power supply terminals comprise flat plates.

19. The connector assembly of claim 12, further comprising a circuit board, the connector mounted to a first side of the circuit board.

20. The connector assembly of claim 19, wherein mounting ends of the two power supply terminals and the two ground terminals are formed as straight strips and inserted into the base, the mounting ends protruding from the base in a direction facing away from the support arms and electrically connecting to the circuit board.

* * * * *